US010031301B2

(12) United States Patent
Glew et al.

(10) Patent No.: US 10,031,301 B2
(45) Date of Patent: Jul. 24, 2018

(54) COMPOSITIONS FOR COMPOUNDING, EXTRUSION, AND MELT PROCESSING OF FOAMABLE AND CELLULAR POLYMERS

(71) Applicant: CABLE COMPONENTS GROUP, LLC, Pawcatuck, CT (US)

(72) Inventors: Charles A. Glew, Charlestown, RI (US); Richard W. Speer, Kernersville, NC (US)

(73) Assignee: Cable Components Group, LLC, Pawcatuck, CT (US)

( * ) Notice: Subject to any disclaimer, the term of this patent is extended or adjusted under 35 U.S.C. 154(b) by 0 days.

(21) Appl. No.: 15/284,177

(22) Filed: Oct. 3, 2016

(65) Prior Publication Data

US 2017/0023756 A1   Jan. 26, 2017

Related U.S. Application Data

(63) Continuation-in-part of application No. 14/934,792, filed on Nov. 6, 2015.
(Continued)

(51) Int. Cl.
*F16L 3/00* (2006.01)
*G02B 6/44* (2006.01)
(Continued)

(52) U.S. Cl.
CPC .......... *G02B 6/4416* (2013.01); *G02B 6/441* (2013.01); *G02B 6/442* (2013.01); *G02B 6/443* (2013.01);
(Continued)

(58) Field of Classification Search
USPC .......................................................... 248/49
See application file for complete search history.

(56) References Cited

U.S. PATENT DOCUMENTS 3,624,250 A   11/1971   Carlson
4,029,868 A   6/1977   Carlson
(Continued)

FOREIGN PATENT DOCUMENTS

CN   103467850 A   12/2013
CN   103804775 A   5/2014
(Continued)

OTHER PUBLICATIONS

International Search Report and Written Opinion for PCT/US2015059485, dated Feb. 25, 2016; 18 pages.
(Continued)

*Primary Examiner* — Monica E Millner
(74) *Attorney, Agent, or Firm* — Reza Mollaaghababa; Thomas J. Engellenner; Pepper Hamilton LLP

(57) ABSTRACT

In one aspect, the present invention relates to a communications cable, which comprises a support separator providing a plurality of channels for receiving transmission media, said support separator comprising a first polymeric material, at least one optical fiber disposed in one of said channels, at least an electrical conductor capable of carrying at least about 10 watts of electrical power disposed in another one of said channels, an insulation at least partially covering said electrical conductor, a jacket surrounding said support separator and said transmission media, said jacket comprising a second polymeric material. In some embodiments, the first and second polymeric materials can be the same material, and in other embodiments, they can be different materials.

29 Claims, 17 Drawing Sheets

Related U.S. Application Data

(60) Provisional application No. 62/076,736, filed on Nov. 7, 2014.

(51) Int. Cl.
*H01B 3/44* (2006.01)
*H01B 1/02* (2006.01)
*H01B 1/22* (2006.01)
*H01B 3/00* (2006.01)
*H01B 7/295* (2006.01)
*H02G 3/04* (2006.01)
*H04B 3/52* (2006.01)

(52) U.S. Cl.
CPC .............. *H01B 1/02* (2013.01); *H01B 1/22* (2013.01); *H01B 3/004* (2013.01); *H01B 3/445* (2013.01); *H01B 7/295* (2013.01); *H02G 3/0406* (2013.01); *H02G 3/0481* (2013.01); *G02B 6/4459* (2013.01); *H04B 3/52* (2013.01)

(56) References Cited

U.S. PATENT DOCUMENTS

| | | | |
|---|---|---|---|
| 4,331,619 A | 5/1982 | Chung et al. | |
| 4,394,460 A | 7/1983 | Chung et al. | |
| 4,513,129 A | 4/1985 | Nakagawa et al. | |
| 4,524,194 A | 6/1985 | Dumoulin | |
| 4,711,811 A * | 12/1987 | Randa | C08J 9/34 174/110 F |
| 4,739,024 A | 4/1988 | Moggi et al. | |
| 4,982,009 A | 1/1991 | Hung | |
| 5,229,432 A | 7/1993 | Muschiatti | |
| 5,310,838 A | 5/1994 | Hung et al. | |
| 5,571,462 A | 11/1996 | Hashimoto et al. | |
| 5,610,203 A * | 3/1997 | Buckmaster | C08J 9/0066 521/143 |
| 5,677,404 A | 10/1997 | Blair | |
| 5,688,885 A | 11/1997 | Blair | |
| 5,703,185 A | 12/1997 | Blair | |
| 5,789,711 A * | 8/1998 | Gaeris | H01B 11/02 174/113 C |
| 5,883,197 A * | 3/1999 | Barbieri | C08J 9/0052 525/340 |
| 5,912,278 A * | 6/1999 | Venkataraman | B29C 44/3446 264/127 |
| 5,952,615 A * | 9/1999 | Prudhon | H01B 11/02 174/113 C |
| 5,959,022 A * | 9/1999 | Lin | C08L 27/16 524/517 |
| 6,064,008 A * | 5/2000 | Craton | H01B 7/295 174/110 FC |
| 6,139,957 A * | 10/2000 | Craton | H01B 7/295 174/110 F |
| 6,150,612 A * | 11/2000 | Grandy | H01B 11/02 174/113 C |
| RE37,010 E * | 1/2001 | Newmoyer | H01B 7/295 174/110 FC |
| 6,231,919 B1 | 5/2001 | Craton | |
| 6,232,357 B1 | 5/2001 | Barbieri et al. | |
| 6,248,954 B1 * | 6/2001 | Clark | H01B 11/04 174/113 R |
| 6,288,340 B1 * | 9/2001 | Arnould | H01B 13/2673 174/113 R |
| 6,297,454 B1 * | 10/2001 | Gareis | H01B 11/06 174/113 C |
| 6,335,490 B1 | 1/2002 | Higashikubo et al. | |
| 6,365,836 B1 * | 4/2002 | Blouin | H01B 11/04 174/113 C |
| 6,395,795 B1 | 5/2002 | Hrivnak | |
| 6,506,809 B2 | 1/2003 | Hrivnak | |
| 6,506,976 B1 * | 1/2003 | Neveux, Jr. | H01B 11/06 174/113 C |
| 6,512,013 B2 | 1/2003 | Hrivnak | |
| 6,573,303 B2 * | 6/2003 | Liu | C08J 11/16 521/41 |
| 6,639,152 B2 * | 10/2003 | Glew | G02B 6/4435 174/113 C |
| 6,687,437 B1 * | 2/2004 | Starnes | G02B 6/4416 174/113 R |
| 6,787,697 B2 * | 9/2004 | Stipes | H01B 11/04 174/113 C |
| 6,800,811 B1 * | 10/2004 | Boucino | H01B 11/06 174/113 C |
| 6,812,314 B2 * | 11/2004 | Lunardi | C08F 10/02 428/35.2 |
| 6,818,832 B2 * | 11/2004 | Hopkinson | H01B 11/04 174/113 C |
| 6,855,889 B2 | 2/2005 | Gareis | |
| 6,946,495 B2 | 9/2005 | Zwynenburg et al. | |
| 7,109,424 B2 * | 9/2006 | Nordin | H01B 11/06 174/113 R |
| 7,172,719 B2 | 2/2007 | Jackson et al. | |
| 7,196,271 B2 | 3/2007 | Cornibert et al. | |
| 7,196,272 B2 * | 3/2007 | Glew | H01B 11/04 174/113 AS |
| 7,202,418 B2 | 4/2007 | Glew | |
| 7,208,683 B2 * | 4/2007 | Clark | H01B 11/04 174/110 R |
| 7,241,826 B2 | 7/2007 | Shiotsuki et al. | |
| 7,256,351 B2 * | 8/2007 | Dillon | H01B 11/04 174/113 R |
| 7,271,343 B2 * | 9/2007 | Clark | H01B 11/02 174/113 R |
| 7,432,447 B2 * | 10/2008 | Glew | G02B 6/4459 174/113 C |
| 7,439,297 B2 * | 10/2008 | Abusleme | C08J 9/0061 428/423.1 |
| 7,465,879 B2 | 12/2008 | Glew | |
| 7,473,849 B2 * | 1/2009 | Glew | H01B 11/06 174/113 C |
| 7,473,850 B2 | 1/2009 | Glew | |
| 7,560,648 B2 * | 7/2009 | Wiekhorst | H01B 7/0233 174/113 R |
| 7,663,061 B2 * | 2/2010 | Gareis | H01B 11/02 174/110 R |
| 7,696,438 B2 | 4/2010 | Clark et al. | |
| 7,772,494 B2 * | 8/2010 | Vexler | H01B 11/04 174/113 C |
| 7,816,606 B2 * | 10/2010 | Wiekhorst | H01B 7/0233 174/110 R |
| 7,897,875 B2 * | 3/2011 | Gareis | H01B 11/06 174/113 C |
| 8,455,762 B2 * | 6/2013 | Vexler | H01B 11/06 174/113 C |
| 8,704,094 B1 * | 4/2014 | Gebs | H01B 11/02 174/110 PM |
| 8,729,394 B2 * | 5/2014 | Clark | H01B 11/06 174/113 C |
| 8,785,782 B2 * | 7/2014 | Kim | H01B 11/04 174/113 C |
| 9,269,476 B2 | 2/2016 | Camp, II et al. | |
| 2002/0061934 A1 * | 5/2002 | Hrivnak | C08J 9/0014 521/85 |
| 2004/0055781 A1 * | 3/2004 | Cornibert | H01B 11/06 174/135 |
| 2004/0118593 A1 * | 6/2004 | Augustine | H01B 11/04 174/113 R |
| 2004/0198886 A1 * | 10/2004 | Shiotsuki | C08J 9/0066 524/404 |
| 2004/0216914 A1 * | 11/2004 | Vexler | H01B 7/295 174/121 A |
| 2005/0006132 A1 * | 1/2005 | Clark | H01B 7/184 174/113 C |
| 2005/0023028 A1 * | 2/2005 | Clark | H01B 11/04 174/113 R |
| 2005/0165165 A1 | 7/2005 | Zwynenburg et al. | |
| 2005/0199415 A1 * | 9/2005 | Glew | G02B 6/4429 174/113 C |

(56) References Cited

U.S. PATENT DOCUMENTS

| | | |
|---|---|---|
| 2005/0255741 A1 | 11/2005 | Ashida et al. |
| 2006/0125136 A1 | 6/2006 | Kratzmuller |
| 2006/0237217 A1 | 10/2006 | Glew |
| 2006/0237218 A1* | 10/2006 | Glew ............... H01B 11/06 174/113 C |
| 2006/0237219 A1 | 10/2006 | Glew |
| 2006/0237221 A1* | 10/2006 | Glew ............... H01B 11/06 174/146 |
| 2007/0026742 A1* | 2/2007 | Park ................ H01B 11/04 439/676 |
| 2007/0052124 A1* | 3/2007 | Park ................ B29C 44/421 264/51 |
| 2007/0102188 A1* | 5/2007 | Glew ............... H01B 7/295 174/113 C |
| 2007/0149629 A1* | 6/2007 | Donovan ........... C08J 9/0061 521/134 |
| 2007/0163800 A1* | 7/2007 | Clark ............... H01B 11/06 174/113 C |
| 2007/0203281 A1* | 8/2007 | Alric ............... H01B 7/29 524/430 |
| 2007/0209825 A1 | 9/2007 | Glew |
| 2007/0219324 A1 | 9/2007 | Aneja et al. |
| 2008/0066947 A1* | 3/2008 | Glew ............... G02B 6/4459 174/131 A |
| 2008/0087454 A1* | 4/2008 | Ohno ............... C08J 9/0066 174/110 F |
| 2008/0264670 A1 | 10/2008 | Glew |
| 2008/0283271 A1* | 11/2008 | Kenny .............. C08F 214/26 174/110 F |
| 2009/0018225 A1* | 1/2009 | Gemmel ............ C08J 9/0066 521/81 |
| 2009/0048359 A1* | 2/2009 | Glew ............... C08J 9/0066 521/79 |
| 2009/0069480 A1* | 3/2009 | Zangara ............ C08K 3/22 524/405 |
| 2009/0130356 A1 | 5/2009 | Mouriuchi et al. |
| 2009/0236120 A1* | 9/2009 | Wiebelhaus ........ H01B 11/002 174/113 AS |
| 2009/0272571 A1* | 11/2009 | Gromko ............ H01B 11/085 174/378 |
| 2010/0072644 A1 | 3/2010 | Glew |
| 2010/0108355 A1* | 5/2010 | Perez ............... H01B 13/141 174/110 SR |
| 2010/0116521 A1* | 5/2010 | Nordin ............. B32B 7/12 174/113 C |
| 2010/0200269 A1* | 8/2010 | Camp, II ........... H01B 11/04 174/113 C |
| 2010/0206609 A1 | 8/2010 | Glew |
| 2010/0243291 A1 | 9/2010 | Glew |
| 2010/0326697 A1* | 12/2010 | Venkataraman ....... C08J 9/0033 174/110 SR |
| 2011/0220390 A1* | 9/2011 | Szylakowski ......... H01B 7/295 174/113 R |
| 2011/0224318 A1 | 9/2011 | Glew et al. |
| 2011/0259626 A1* | 10/2011 | Speer .............. H01B 11/10 174/113 C |
| 2011/0284287 A1 | 11/2011 | Glew |
| 2012/0045186 A1* | 2/2012 | Wessels, Jr. ........ G02B 6/4469 385/113 |
| 2013/0011106 A1* | 1/2013 | Congdon, II ........ G02B 6/44 385/101 |
| 2013/0037302 A1* | 2/2013 | Kroushl ............ H01B 7/295 174/116 |
| 2013/0248218 A1* | 9/2013 | Glew ............... H05K 9/0098 174/34 |
| 2013/0248240 A1 | 9/2013 | Glew et al. |
| 2013/0269967 A1* | 10/2013 | Camp, II .......... H01B 11/04 174/27 |
| 2014/0069687 A1* | 3/2014 | Tryson ............. H01B 17/14 174/113 R |
| 2014/0262427 A1* | 9/2014 | Brown ............. H01B 3/301 174/113 C |

FOREIGN PATENT DOCUMENTS

| | | |
|---|---|---|
| EP | 0413255 B1 | 3/1996 |
| EP | 1520880 A2 | 4/2005 |
| EP | 2176326 B1 | 7/2011 |
| EP | 2380923 A1 | 10/2011 |
| JP | 0726050 A | 1/1995 |
| JP | 08012796 A | 1/1996 |
| JP | 2007126631 A | 5/2007 |
| KR | 0129862 B1 | 4/1998 |
| KR | 20070004583 A | 1/2007 |
| WO | 9715623 A1 | 5/1997 |
| WO | 03000792 A1 | 1/2003 |
| WO | 2009019209 A1 | 2/2009 |
| WO | 2009020554 A2 | 2/2009 |

OTHER PUBLICATIONS

International Preliminary Report on Patentability for PCT/US2015/059485, dated May 18, 2017; 15 pages.

Extended European Search Report received in EP Application No. 15857512.6 dated Oct. 27, 2017; 7 pages.

Final Office Action received in U.S. Appl. No. 14/934,792 dated Aug. 25, 2017; 14 pages.

Non-Final Office Action received in U.S. Appl. No. 14/934,792 dated Jan. 25, 2017 13 pages.

* cited by examiner

COMPOSITIONS FOR COMPOUNDING, EXTRUSION, AND MELT PROCESSING OF FOAMABLE AND CELLULAR POLYMERS

CROSS-REFERENCE TO RELATED APPLICATIONS

This application is a continuation in part of U.S. application Ser. No. 14/934,792, filed Nov. 6, 2015, which claims priority to U.S. Provisional Application No. 62/076,736, filed Nov. 7, 2014, which are hereby incorporated by reference in their entirety.

BACKGROUND OF INVENTION

The present application relates generally to communication cables, and particularly to communication cables that allow transmission of both data and electrical power. A broad range of electrical cables and buffered optical fibers are installed in modern buildings for a wide variety of uses. These cables are used, for example, to provide data transmission between computers, voice communications, as well as control signal transmission for building security, fire alarms, and temperature control systems. Cable networks extend throughout modern office and industrial buildings, and frequently extend through the space between the dropped ceiling and the floor above.

Ventilation system components are also frequently extended through this space for directing heated and chilled air to the space below the ceiling and also to direct return air exchange. The space between the dropped ceiling and the floor above is commonly referred to as the plenum area. Electrical cables and fiber optic cables extending through plenum areas are governed by special provisions of the National Electric Code ("NEC").

Because flame and smoke can travel along the extent of a plenum area in the event of electrical fire, the National Fire Protection Association ("NFPA") developed a standard to reduce the amount of flammable material incorporated into insulated electrical conductors, fiber optic buffers and jacketing of cables. Reducing the amount of flammable material, according to the NFPA, would reduce the potential of insulation, fiber optic buffering, and jacket materials to spread flames and smoke to adjacent plenum areas and potentially to more distant and widespread areas in a building.

In 1975, the NFPA recognized the potential flame and smoke hazards created by burning cables in plenum areas and adopted in the NEC a standard for flame retardant and smoke suppressant cables. This standard, commonly referred to as "the Plenum Cable Standard," permits the use of a cable without a conduit, so long as the cable exhibits low smoke and flame retardant characteristics. The test method for measuring these characteristics is commonly referred to as the Steiner Tunnel Test. The Steiner Tunnel Test has been adapted for the burning of cables according to the following test protocols: NFPA 262, Underwriters Laboratories ("U.L.") 910, or Canadian Standards Association ("CSA") FT-6. The test conditions for each of the U.L. 910 Steiner Tunnel Test, CSA FT-6, and NFPA 262 are: a 300,000 BTU/hour flame is applied for 20 minutes to 24-foot lengths of test cables mounted on a horizontal tray within a tunnel. The criteria for passing the Steiner Tunnel Test are as follows:

Flame Spread Requirement: less than 5 feet
Smoke Generation Requirements:
1. Maximum optical density of smoke less than 0.5
2. Average optical density of smoke less than 0.15 of fire retardant cabling This standard is one of the most stringent test methods for residential and commercial buildings. In plenum applications for voice and data transmission, electrical conductors and cables should exhibit low smoke evolution, low flame spread, and favorable electrical properties to pass the stringent requirements of copper data cables. Category 5e cables have evolved to provide even higher data transmission speeds with 10 gigabit per second cables, which are now designated Categories ("Cat") 6, 6e and 6A. A Category 8, or a 40 gigabit per second cable, is being developed. Cables selected for plenum applications must exhibit a balance of properties and every component in a communications cable must perform its role.

Separators, jackets, insulations, buffer tubes and blown fiber tubing used in cables that meet the electrical requirements of Categories 6 and 7 must also pass the new norms for flammability and smoke generation. Tables 1 and 2, below, indicate categories for flame and smoke characteristics and associated test methods as discussed herein.

Fiber optic cables and fiber optic blown tubing, which are used in the plenum areas of buildings, must adhere to the same flame retardancy and low smoke characteristics of the NFPA 262 Plenum Test. Underwriters Laboratory (UL 2885) is a test method for determining whether components or materials of a cable can be designated as a non-halogen cable. Underwriters Laboratory (UL 2885), titled *Acid Gas, Acidity and Conductivity of Combusted Materials and Assessment*, uses IEC 60754-1, IEC 6074-2 and IEC 62821-1 to benchmark "all materials" within the cable design, i.e., insulation, spline or crosswebs, tapes or other cable fillers, fiber optic buffer and the overall jacket. Based on these test methods, a determination can be made for the presence of halogens, e.g., chlorine, bromine and fluorine. Test protocol 62821-1 Annex B, determines the presence of a halogen using the Sodium Fusion Procedure as described in Part 5.3 IEC 62821-2, i.e., Chemical Test: Determination of Halogens—Elemental Test.

Materials evaluated to IEC 62821-1 Annex B Assessment of Halogens Required for extruded material.

The test protocol consists of the following stages:

Stage 0: Determination of Halogens—elemental test for chlorine, bromine and fluorine using the sodium fusion procedure as described in part 5.3 of IEC 62821-2 (Chemical Test: Determination of Halogens—Elemental Test). If the results for chlorine or bromine or fluorine are positive, proceed to Stage 1.

Stage 1: Test according to 6.2.1 of 60754-2 for pH and Conductivity. If the pH is ≥4.3, the conductivity is >2.5 μS/mm and ≤10 μS/mm, proceed to Stage 2.

Stage 2: Test according to 6.1.1 of 60754-1 for chlorine and bromine content expressed as HCl. If the result if ≤0.5%, proceed to Stage 3.

Stage 3: Test for the determination of low levels of fluorine as described in part 45.2 of IEC 60684-2 (Determination of low levels of fluorine) Methods A (Ion selective electrode method fluoride) or B (Alizarin fluorine blue method).

The European standards have similar goals of fire retardant and low smoke generation cables. Polyvinylchloride, a halogenated material, remains a dominant jacketing grade throughout the European cable community. The standards which have evolved are the so-called International Classification and Flame Test Methodology for Communications Cable. Based on these evolving standards, a new list of acronyms has evolved, albeit with much similarity to the North American standards.

These Euro-classes for cables measure the following:
A. Flame Spread=FS
B. Total Heat Release=THR
C. Heat Release Rate=HRR
D. Fire Growth Rate=FIGRA
E. Total Smoke Production=TSP
F. Smoke Production Rate=SPR The European International Classification and Test Methodology for Communication Cables is shown below in Table 1 and it is shown in an abbreviated form.

TABLE 1

The European International Classification and Test Methodology for Communication Cables

| Class | Test Methods | Classification Criteria | Additional Classification |
|---|---|---|---|
| $A_{ca}$ | EN ISO 1716 | PCS ≤2.0 MJ/kg (1) | Note: Mineral filled circuit integrity cable |
| $B1_{ca}$ | EN 50399 (30 kW flames source) and | FS ≤1.75 m and $THR_{1200}$ ≤10 MJ and Peak HRR ≤20 kW and FIGRA ≤120 $Ws^{-1}$ | Smoke production (2, 5) and Flaming droplets/particles (3) and Acidity (4, 7) |
|  | EN 60332-1-2 | H ≤425 mm |  |
| $B2_{ca}$ | EN 50399 (20.5 kW flames source) and | FS ≤1.5 m and $THR_{1200s}$ ≤15 MJ and Peak HRR ≤30 kW and FIGRA ≤150 $Ws^{-1}$ | Smoke production (2, 5) and Flaming droplets/particles (3) and Acidity (4, 7) |
|  | EN 60332-1-2 | H ≤425 mm |  |
| $C_{ca}$ | EN 50399 (20.5 kW flames source) and | FS ≤2.0 m and $THR_{1200s}$ ≤30 MJ and Peak HRR ≤60 kW and FIGRA ≤300 $Ws^{-1}$ | Smoke production (2, 6) and Flaming droplets/particles (3) and Acidity (4, 7) |
|  | EN 60332-1-2 | H ≤425 mm |  |
| $D_{ca}$ | EN 50399 (20.5 kW flames source) and | $THR_{1200s}$ ≤70 MJ and Peak HRR ≤400 kW and FIGRA ≤1300 $Ws^{-1}$ | Smoke production (2, 6) and Flaming droplets/particles (3) and Acidity (4, 7) |
|  | EN 60332-1-2 | H ≤425 mm |  |
| $E_{ca}$ | EN 60332-1-2 | H ≤425 mm |  |
| $F_{ca}$ | No Performance Determined |  |  |

Table 2, below, provides a listing and comparison of the North American standards and the European standards from most stringent flame retardancy and low smoke requirements to least stringent.

TABLE 2

A comparison of North American & European Fire Performance Standards from most severe to least severe for Communications Cables

|  | North America Standard | European Standard | North American Test Protocols | European Test Protocols |
|---|---|---|---|---|
| Most Severe | Plenum Test UL 910 NFPA 262 FT-6 CMP | Class B1 LAN Comm. Cables EN 50399-30 KW EN 60332-1-2 | Steiner Tunnel - 88 KW 300 BTU @ 20 minutes plus smoke peak <.5 Average <.15 | Class B1 30 KW Flame Sources FS <1.75 m, THR <10 mg Peak HRR <20 KW FIGRA <120 WS |
| Severe | Riser Test UL 1666 FT-4 CMR | Class C EN 50399-10..5 KW & EN60332-1-2 | Riser Test - 154 KW 527 KW @ 30 minutes | Class C 20.5 KW Flame Source FS <2.0 m TGR <30 m; Peak HRR <60 KW FIGRA <300 WS |
| Less Severe | General Purpose Tray Cable Test UL 1581 FT-2/CM | Class D IEC 60332-3 EN 50399-20.5 KW | General Purpose 20.5 KW 70K BIT @ 20 minutes | Class D 20.5 KW Flame Source THR <70 m; PEAK HRR <400 KW FIGRA 1300 WS |
| Least Severe | VW-1 FT-1 | Class E IEC 60332-1 | Bunsen Burner Test 1 minute (15 seconds flame) | Class E H <425 mm |

In addition to the requirement of low smoke evolution and flame retardancy for plenum cables, there is a growing need for enhanced electrical properties for the transmission of voice and data over twisted pair cables. In this regard, standards for electrical performance of twisted pair cables are set forth in the Telecommunications Industry Association (TIA) and American National Standards Institute (ANSI) in ANSPTIA-568-C.2. Similarly, the standards for data transmission over optical fiber cables are covered in ANSPTIA-568-C.3.

A balance of properties or attributes is needed for each component (e.g., insulation, buffer, cable fillers, fiber optic strength member, fiber optic blown tubing and jacketing) within copper and fiber communications cable so that it can meet the electrical performance of copper cabling or the transmission characteristics of fiber optic high speed data cable and pass the NFPA 262 Flame and Smoke Requirements, the NFPA 259 flame requirements and similarly the European standards for Class B and Class C.

Optical fiber cables exhibit a set of needs that include unique mechanical properties to prevent damage to the fragile glass fibers. These needs are evolving for hybrid copper and fiber designs, Passive Optical Networks (PON) or Power over Ethernet (PoE). For instance, PoE will generate more heat as it provides data transmission as well as power to LED lighting, wireless interface points, cameras and is employed in a wide range of other applications, whereby temperature control and office automation can be accomplished remotely from interactive phones and computer devices.

PoE relates to a system in which electrical power can pass safely along with data on cables (e.g., Ethernet cables). IEEE 802.3af—2003 standard provides for up to 15.4 watts of DC power and can operate with Category 3 cables at this low power requirement. IEEE 802.3 at—2009 standard also known as PoE+ or PoE plus provides for 25.5 watts of power over Category 5 or higher.

There remains a need for a communications cable that can operate reliably while minimizing or eliminating cross-talk between conductors within a cable or alien cross-talk between cables, and also a need for separators for use in such telecommunications cables, while meeting the design criteria described above. There also remains a need for a communications cable that can provide low smoke generation and overall flame retardancy, e.g., as required by the NEC for use in plenum and riser areas of a building.

SUMMARY OF THE INVENTION

In one aspect, the present invention relates to a communications cable, which comprises a support separator providing a plurality of channels for receiving transmission media, said support separator comprising a first polymeric material, at least one optical fiber disposed in one of said channels, at least an electrical conductor (e.g., a twisted pair of conductors) capable of carrying at least about 10 watts of electrical power disposed in another one of said channels, an insulation at least partially covering said electrical conductor, a jacket surrounding said support separator and said transmission media, said jacket comprising a second polymeric material. In some embodiments, the first and second polymeric materials can be the same material, and in other embodiments, they can be different materials.

In some embodiments, the support separator of the communications cable can comprise a foamed or a solid polymeric material. In some aspects, the insulation of the twisted pairs can comprise a foamed or solid polymeric material. In some embodiments, the foamed polymer can exhibit a foaming level in a range of about 20% to about 60%, about 20% to about 70%, or about 30% to about 60%. Further, in some embodiments, the foamed polymeric material can include a plurality of cellular structures characterized by a size in a range of about 0.0005 inches to about 0.003 inches or about 0.001 inches to about 0.002 inches. In some embodiments, at least about 60%, at least about 70%, or at least about 80% of the cellular structures are closed cells.

For example, the foamed or solid polymeric material can comprise a fluoropolymer, e.g., a perfluoropolymer. Some examples of suitable fluoropolymers include, without limitation, MFA (polytetrafluoroethylene-perfluoromethylvinylether), FEP (fluorinated ethylene propylene), PFA (perfluoroalkoxy), PVF (polyvinyl fluoride), ETFE (ethylene tetrafluoroethylene or (poly(ethylene-co-tetrafluoroethylene)), ECTFE (ethylene chlorotrifluoroethlyene), and PVDF (polyvinylidene fluoride).

In some embodiments, the foamed or solid polymeric material can comprise a non-halogenated polymer, such as an engineered resin. Examples of engineered resins or non-halogenated polymers include, but are not limited to, polyphenylenesulfide (PPS), polyetherimide (PEI), polysulfone (PSU), polypheylsulfone (PPSU), polyethersulfone (PES/PESU), polyetheretherketone (PEEK), polyaryl etherketone (PAEK), polyetherketoneketone (PEKK), polyetherketone (PEK), or polyolefins such as polyethylene (PE), polyproplylene (PP), cyclic olefin copolymer (COC), polycarbonate (PC), polyphenylene ether (PPE), liquid crystal polymer (LCP), and/or combinations thereof.

In one aspect, the present invention relates to a communications cable, having a one or more electrical conductor that is capable of carrying at least about 10 watts of power (e.g., 10 watts, 20 watts, 30 watts, 40 watts, 50 watts, 60 watts, or more than 60 watts). For example, the electrical conductor is capable of carrying power in a range of about 10 watts to about 200 watts. In some embodiments, each of the one or more electrical conductors can transmit data, electrical power, or both.

In some embodiments, the communications cable can have a jacket with an internal diameter equal to or less than about 0.4 inches (about 10 mm). For example, the internal diameter of the jacket can be in a range of about 0.24 inches (6 mm) to about 0.32 inches (8 mm) or in a range of about 0.24 inches (6 mm) to about 0.27 inches (7 mm). The thickness of the jacket can be from about 0.005 inches (0.172 mm) to about 0.015 inches (0.381 mm), or about 0.007 inches (0.18 mm) to about 0.010 inches (0.25 mm).

In some aspects, the electrical conductor is a twisted pair conductor. Each wire of the twisted pair can have an American Wire Gauge (AWG) in a range of about 22 to about 26.

In some aspects, the optical fiber is a multi-mode optical fiber. In other aspects, the optical fiber is a single-mode optical fiber.

In some embodiments, the separator of the communications cable described herein can have a flap-top configuration. In other embodiments, the separator can have arms that do not terminate in flap-top portions.

In another aspect, a communications cable is disclosed which comprises a support separator including a central region and a plurality of outwardly extending portions extending from the central region, said outwardly extending portions providing a plurality of channels for receiving transmission media, said support separator comprising a foamed polymeric material, at least one electrical conductor disposed in one of said channels, said electrical conductor being capable of carrying an electrical power in a range of about 10 watts to about 200 watts, at least one optical fiber disposed in another one of said channels, a jacket surrounding said support separator and said transmission media, said jacket having an inner diameter equal to or less than about 0.4 inches. In some embodiments, at least one of outwardly extending portions comprises a flap-top.

In some embodiments at least two of the outwardly extending portions comprises a flap-top such that said flap-tops are configured to facilitate closure of one of said channels. In some embodiments, an optical fiber can be disposed in the closed channel.

In a related aspect, a communications cable is disclosed which comprises a support separator providing a plurality of channels for receiving transmission media, said support separator comprising a first polymeric material, at least one optical fiber disposed in one of said channels, at least an electrical conductor capable of carrying at least about 10 watts of electrical power disposed in another one of said channels, a tape surrounding at least one of the transmission media, said tape comprising a solid or a foamed second polymeric material. The first and second polymeric materials can be the same or different.

Further understanding of various aspects of the invention can be obtained by reference to the following detailed description in conjunction with the associated drawings, which are described briefly below.

BRIEF DESCRIPTION OF THE DRAWINGS

Features and advantages of the claimed subject matter will be apparent from the following description of embodiments consistent therewith, which the description should be considered in conjunction with the accompanying drawings.

DETAILED DESCRIPTION OF THE INVENTION

Figure 1:
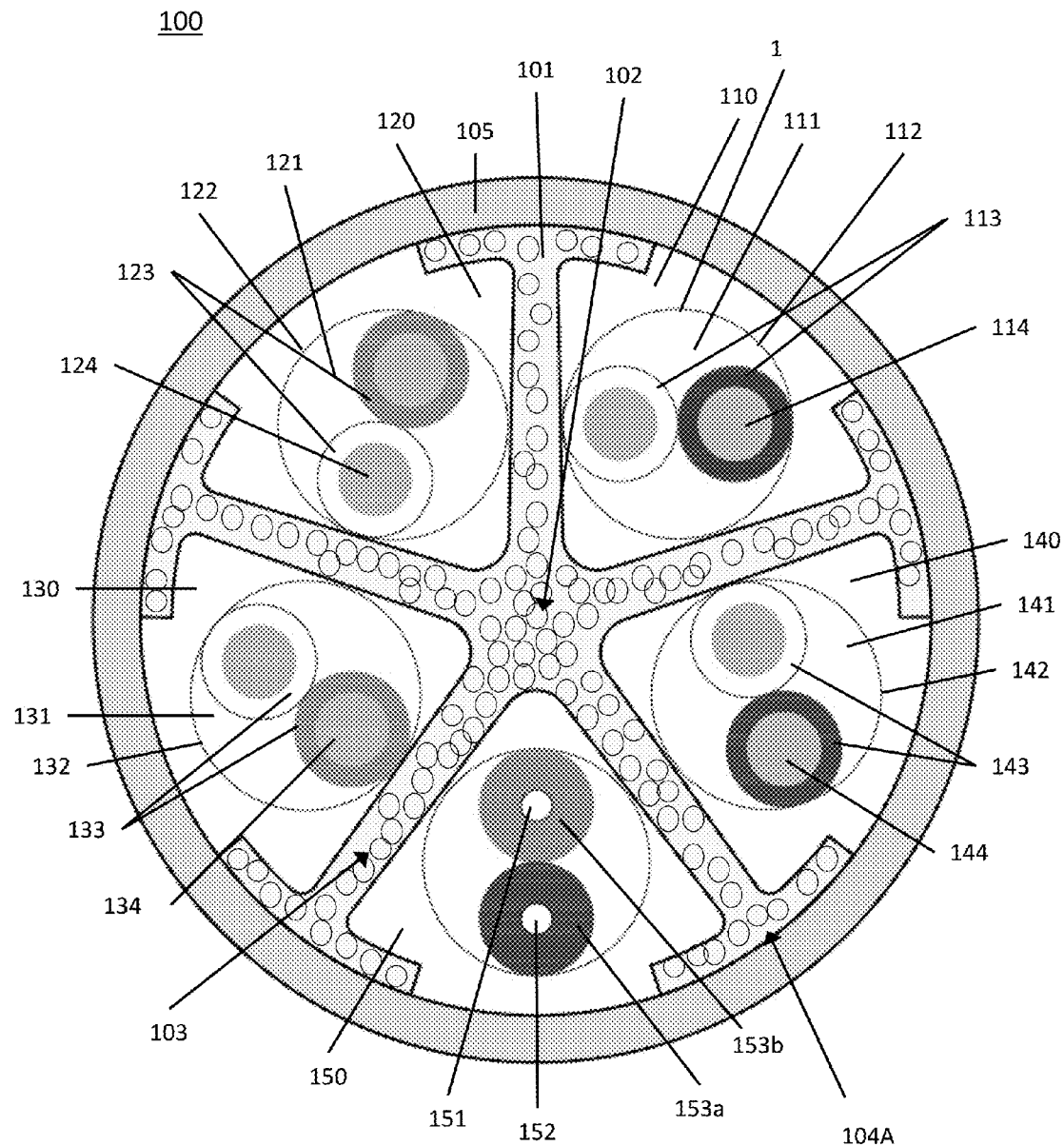
FIG. 1 illustrates an embodiment of a jacketed Power over Ethernet 4-pair copper cable having five channels in one of which two fiber optic cables are disposed.

The present invention generally relates to communications cables that include different transmission media and can be used for transmission of data as well as electrical power. In many embodiments, the materials forming various components of the cable are selected to facilitate the dissipation of heat generated in the cable via passage of current therethrough. For example, in some embodiments a separator used to provide multiple channels in which transmission media are disposed, the insulation of the transmission media and the cable's jacket are formed of foamed fluoropolymers so as to facilitate the dissipation of heat generated in the cable. The use of foamed components also reduces the amount of flammable material in the cable. In some embodiments, the efficient dissipation of heat in a POE cable according to the present teachings allows forming such a cable in a compact manner, e.g., using a jacket with an inner diameter less than about 0.4 inches.

Certain exemplary embodiments will now be described to provide an overall understanding of the principles of the structure, function, manufacture, and use of the compositions, devices, and methods of producing and making the communication cables disclosed herein. One or more examples of these embodiments are illustrated in the accompanying drawings. Those skilled in the art will understand that the cables, cable components and methods of making the same specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

So that the invention may more readily be understood, certain terms are first defined.

As used herein, the terms "about" or "approximately" for any numerical values or ranges indicate a suitable dimensional tolerance that allows the composition, part, or collection of elements to function for its intended purpose as described herein. These terms indicate at most a ±5% variation about a central value.

The term "cross-talk" is used herein consistent with its common usage in the art to refer to electromagnetic interference between conductors, cables, or other electronic circuit elements.

The term "engineered resin" or "engineering polymer" as used herein refers to any of the following polymers: polyphenylenesulfide (PPS), polyetherimide (PEI), polysulfone (PSU), polypheylsulfone (PPSU), polyethersulfone (PES/PESU), polyetheretherketone (PEEK), polyaryletherketone (PAEK), polyetherketoneketone (PEKK), polyetherketone (PEK), or polyolefins such as polyethylene (PE), polypropylene (PP), cyclic olefin copolymer (COC), polycarbonate (PC), polyphenylene ether (PPE), liquid crystal polymer (LCP), and/or combinations thereof.

The term "fluoropolymer" is used herein consistent with its common usage in the art to refer a polymer having at least one monomer that includes at least one fluorine atom.

The term "per(halo)polymer" is used herein consistent with its common usage in the art to refer to a polymer that includes monomers in which substantially all hydrogen atoms have been replaced with halogen atoms (e.g., fluorine, chlorine or bromine atoms).

The term "perfluoropolymer" is used herein consistent with its common usage in the art to refer to a fluoropolymer in which substantially all hydrogen atoms have been replaced with fluorine atoms.

As used herein, "foaming level" is the ratio of the volume of cells in a cellular structure, e.g. a cellular separator, relative to the total volume of the structure.

As used herein, the term "melt-processable" is meant that the polymer can be processed (i.e. fabricated into shaped articles, insulation(s), jacket coatings, films, fibers, tubes, wire coatings and the like) by conventional melt extruding, injecting or casting means.

The term "thermoplastic" as used herein, refers to polymers that are pliable or moldable above a specific temperature and return to a solid state upon cooling. These polymers have the property of becoming soft when they are heated and of becoming rigid again when they are cooled, without undergoing an appreciable chemical change. Such a definition may be found, for example, in the encyclopedia called "Polymer Science Dictionary", Mark S. M. Alger, London School of Polymer Technology, Polytechnic of North London, UK, published by Elsevier Applied Science, 1989.

As used herein, the term "elastomer" is intended to designate a true elastomer or a polymer resin serving as a base constituent for obtaining a true elastomer. True elastomers are defined by the ASTM, Special Technical Bulletin, No. 184 standard as materials capable of being stretched, at room temperature, to twice their intrinsic length and which, once they have been released after holding them under tension for 5 minutes, return to within 10% of their initial length in the same time.

As used herein, the term "active nucleating agent" is intended to denote a compound which acts both as a nucleating agent and, at the same time, participates in blowing, by at least partially decomposing to yield gaseous components.

FIG. 1 schematically depicts a communication cable 100 according to an embodiment of the present teachings, which includes a support separator 101 providing five channels 110, 120, 130, 140, 150 for receiving transmission media. The support separator 101 includes a central portion 102 and a plurality of arms 103 extending radially from the central portion 102 such that the channels 110, 120, 130, 140, 150 are provided between the plurality of arms 103. In this embodiment, each arm 103 extends from the central portion 102 to a flap top portion 104A. In this embodiment, two adjacent flap top portions 104A partially enclose one of the channels 110, 120, 130, 140, 150. In other embodiment, at least two adjacent flap top portions can circumferentially extend so as to cooperatively substantially or completely enclose a channel (e.g., channel 150 in FIG. 2). In other embodiments, the arms of the separator may not extend to a flap top portion. Further, while in this embodiment the separator 101 is configured to provide five channels for receiving transmission media, in other embodiments, the number of channels can be less or more.

Although in this embodiment, the support separator 101 of the communications cable 100 is formed of a foamed polymeric material, in other embodiments, it can be formed of a solid polymeric material In this embodiment, the foamed polymeric support separator can exhibit a foaming level in a range of about 20% to about 60%, about 20% to about 70%, or about 30% to about 60%. Further, the foamed separator can comprise a plurality of cellular structures characterized by a size in a range of about 0.0005 inches to about 0.003 inches or about 0.001 inches to about 0.002 inches. In some embodiments, at least about 60%, at least about 70%, or at least about 80% of the cellular structures can be in in the form of closed cells.

The separator 101 can be formed of any suitable polymer. For example, the separator 101 can be formed of a fluoropolymer, such as a perfluoropolymer. Some examples of suitable polymeric materials include, without limitation, MFA (polytetrafluoroethylene-perfluoromethylvinylether), FEP (fluorinated ethylene propylene), PFA (perfluoroalkoxy), PVF (polyvinyl fluoride), ETFE (ethylene tetrafluoroethylene or (poly(ethylene-co-tetrafluoroethylene)), ECTFE (ethylene chlorotrifluoroethlyene), PVDF (polyvinylidene fluoride), and combinations thereof.

In some embodiments, the separator 101 can be formed of a non-halogenated polymer, i.e., engineered resin. Examples of engineered resins include, but are not limited to, polyphenylenesulfide (PPS), polyetherimide (PEI), polysulfone (PSU), polypheylsulfone (PPSU), polyethersulfone (PES/PESU), polyetheretherketone (PEEK), polyaryletherketone (PAEK), polyetherketoneketone (PEKK), polyetherketone (PEK), or polyolefins such as polyethylene (PE), polypropylene (PP), cyclic olefin copolymer (COC), polycarbonate (PC), polyphenylene ether (PPE), liquid crystal polymer (LCP), and/or combinations thereof.

In this embodiment, a twisted pair of electrical conductors (e.g., copper wires) 111, 121, 131 and 141 is disposed in each of channels 110, 120, 130, and 140. Each twisted pair of electrical conductors 111, 121, 131 and 141 can be configured to carry electrical data, power, or combinations thereof. In this embodiment, the electrical conductors are configured to carry both power and communications data. For example, each twisted pair of electrical conductors 111, 121, 131 and 141 is capable of carrying at least about 10 watts of electrical power. By way of example, each twisted pair of electrical conductors can be capable of carrying electrical power in a range of about 10 watts to about 200 watts, e.g., in a range of about 20 watts to about 100 watts. In this embodiment, each electrical conductor can be configured to carry at least about 10 watts of power (e.g., 10 watts, 20 watts, 30 watts, 40 watts, 50 watts, 60 watts, or more than 60 watts). In some implementations, the electrical conductors of the twisted pairs can have a gauge (AWG) in a range of about 22 to about 26. Also, each twisted pair 111, 121, 131 and 141 can have an electrical insulation 113, 123, 133 and 143 wrapped around it.

The electrical insulation 113, 123, 133 and 143 of the communications cable 100, can be formed of a foamed or a solid polymeric material. In this embodiment, the insulation of the electrical conductors is formed of a solid polymeric material, such as a fluoropolymer (e.g., a perfluoropolymer). Some examples of suitable polymers include, without limitation, MFA (polytetrafluoroethylene-perfluoromethylvinylether), FEP (fluorinated ethylene propylene), PFA (perfluoroalkoxy), PVF (polyvinyl fluoride), ETFE (ethylene tetrafluoroethylene or (poly(ethylene-co-tetrafluoroethylene)), ECTFE (ethylene chlorotrifluoroethlyene), PVDF (polyvinylidene fluoride), and combinations thereof.

In other embodiments, such as some of the embodiments discussed below, electrical insulation 113, 123, 133 and 143 can be formed of a foamed polymer. In some such embodiments, the foamed polymer can exhibit a foaming level in a range of about 20% to about 60%, about 20% to about 70%, or about 30% to about 60%. In some embodiments, the foamed polymer can comprise a plurality of cellular structures (schematically depicted as circles) characterized by a size in a range of about 0.0005 inches to about 0.003 inches or about 0.001 inches to about 0.002 inches. In some embodiments, at least about 60%, at least about 70%, or at least about 80% of the cellular structures are closed cells.

In this embodiment, two optical fibers 151 and 152 are disposed within the channel 150. A variety of different types of optical fibers can be employed. For example, the optical fibers 151, 152 can be a single-mode or a multi-mode optical fiber for transmission of optical radiation (e.g., radiation at telecommunications wavelengths, e.g., at 1550 nm) from a proximal end of the cable to its distal end. The optical fibers 151, 152 are enclosed within a buffer tubes 153*a* and 153*b*.

The buffer tubes 153*a* and 153*b* can be formed of any suitable polymer. For example, the buffer tube can be formed of a fluoropolymer, such as a perfluoropolymer. Some examples of suitable materials for foaming the buffer tubes include, without limitation, MFA (polytetrafluoroethylene-perfluoromethylvinylether), FEP (fluorinated ethylene propylene), PFA (perfluoroalkoxy), PVF (polyvinyl fluoride), ETFE (ethylene tetrafluoroethylene or (poly(ethylene-co-tetrafluoroethylene)), ECTFE (ethylene chlorotrifluoroethlyene), PVDF (polyvinylidene fluoride), and combinations thereof.

In some embodiments, a tape 1 can enclose the electrical conductors and/or the optical fibers. The tape 1 can be formed of a solid or foamed polymeric material, such as the polymers discussed above.

Figure 2:
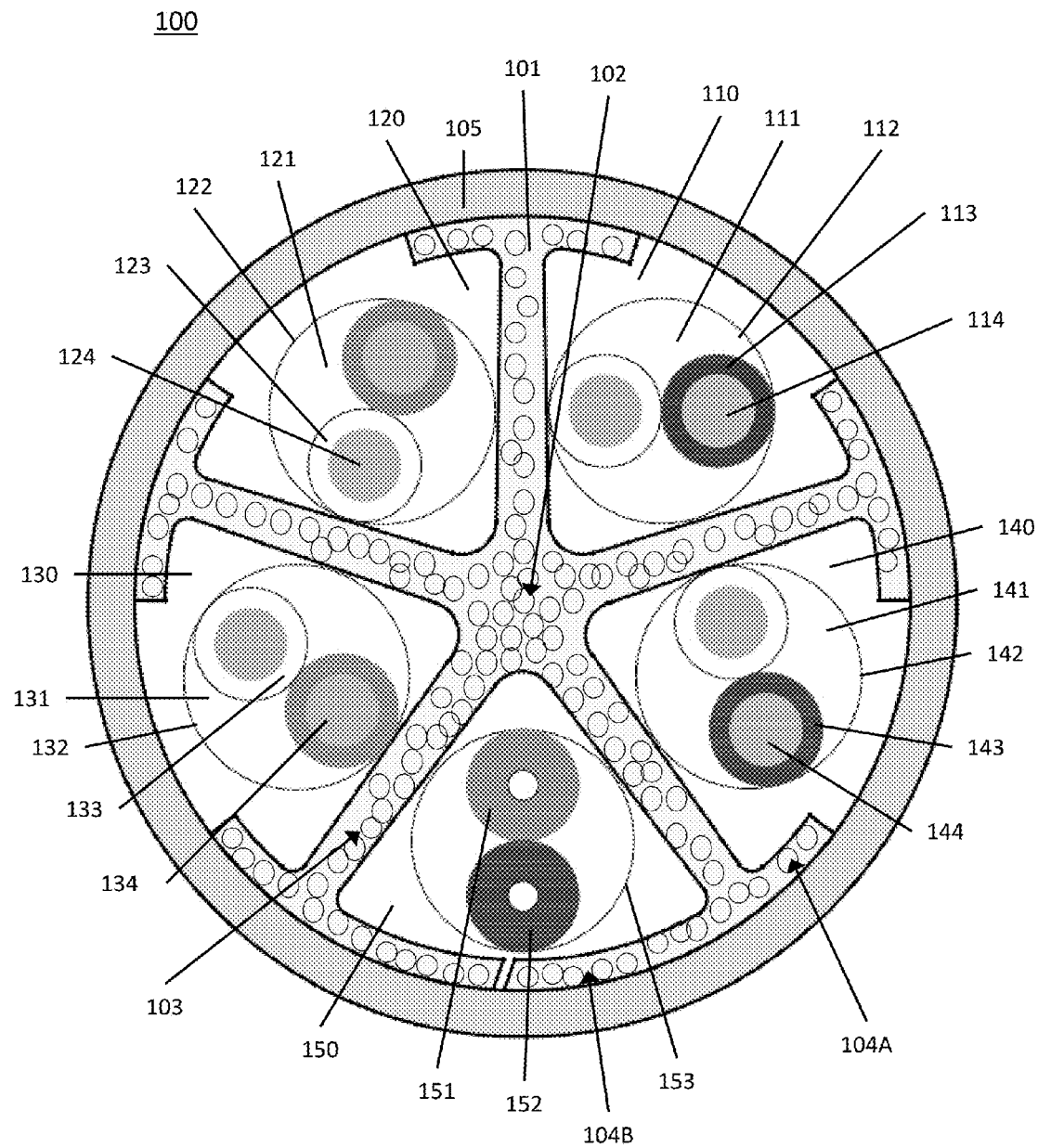
FIG. 2 illustrates an embodiment of a POE 4-pair copper cable having five channels with one closed channel in which two fiber optic cables are disposed.

With continued reference to FIGS. 1 and 2, a jacket 105 surrounds the separator 101 and the transmission media disposed in the channels provided by the separator 101. The jacket 105 can be formed using any suitable polymer. Some examples of suitable polymeric materials include, without limitation, MFA (polytetrafluoroethylene-perfluoromethylvinylether), FEP (fluorinated ethylene propylene), PFA (perfluoroalkoxy), PVF (polyvinyl fluoride), ETFE (ethylene tetrafluoroethylene or (poly(ethylene-co-tetrafluoroethylene)), ECTFE (ethylene chlorotrifluoroethlyene), PVDF (polyvinylidene fluoride), and combinations thereof.

In some embodiments, the jacket 105 can have an internal diameter equal to or less than about 0.4 inches (about 10 mm). For example, the internal diameter of the jacket 105 can be in a range of about 0.24 inches (6 mm) to about 0.32 inches (8 mm) or in a range of about 0.24 inches (6 mm) to about 0.27 inches (7 mm). In some embodiments, the thickness of the jacket 105 can be from about 0.005 inches (0.127 mm) to about 0.015 inches (0.381 mm), or about 0.007 inches (0.18 mm) to about 0.010 inches (0.25 mm).

Figure 3:
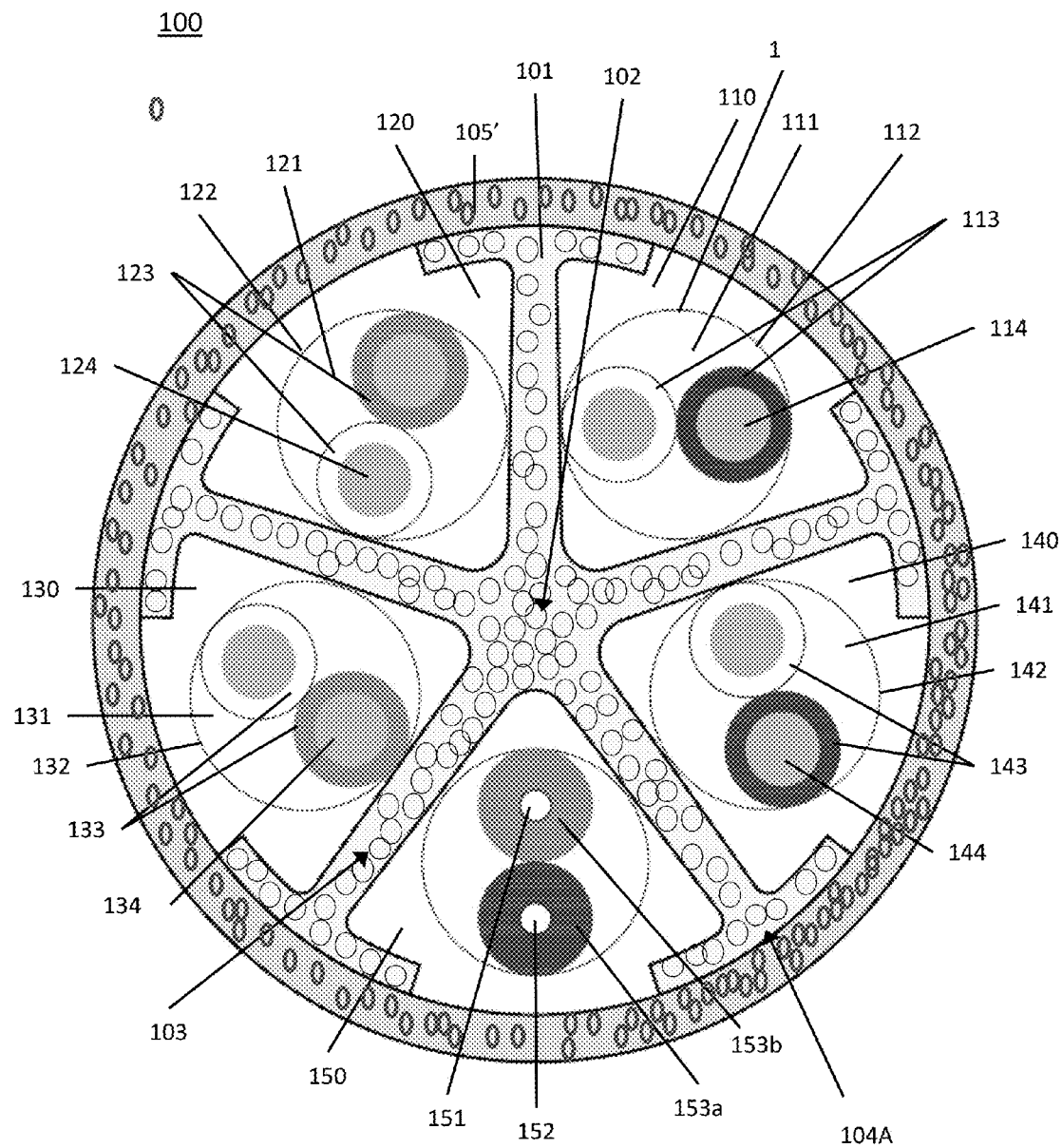
FIG. 3 illustrates an embodiment of an POE cable according to the present teachings.

In some embodiments of a communications cable according to the present invention, a jacket surrounding the separator and the transmission media can be formed of a foamed polymeric material. By way of example, FIG. 3 schematically depicts a communications cable 100' that is similar to the communications cable 100 discussed in connection with FIGS. 1 and 2 except that the communications cable 100' includes a foamed jacket 105'. More specifically, similar to the communications cable 100, the communications cable 100' includes the foamed separator 101, which provides five channels 110, 120, 130, 140, and 150. The twisted pairs of electrical conductors 111, 121, 131, and 141 are disposed, respectively, in the channels 110, 120, 130, and 140. Each twisted pair can carry electrical data, power, or combinations thereof. In some embodiments, the electrical conductors of the twisted pairs can have a gauge (AWG) in a range of about 18 to about 28. The electrical insulations 112, 122, 132, and 142 surround the twisted pairs 111, 121, 131, and 141. The optical fibers 151 and 152 are disposed within the channel 150.

As noted above, in this embodiment, the jacket 105' is formed of a foamed polymeric material. By way of example, the jacket 105' can be formed of a foamed fluoropolymer, e.g., a foamed perfluoropolymer. Some examples of suitable fluoropolymers can include, without limitation, MFA (polytetrafluoroethylene-perfluoromethylvinylether), FEP (fluorinated ethylene propylene), PFA (perfluoroalkoxy), PVF (polyvinyl fluoride), ETFE (ethylene tetrafluoroethylene or (poly(ethylene-co-tetrafluoroethylene)), ECTFE (ethylene chlorotrifluoroethlyene), PVDF (polyvinylidene fluoride), and combinations thereof.

In some embodiments, the foamed jacket 105' can exhibit a foaming level in a range of about 20% to about 60%, about 20% to about 70%, or about 30% to about 60%. In some embodiments, the foamed jacket can comprise a plurality of cellular structures (herein depicted schematically by a plurality of small circles distributed through the jacket) characterized by a size in a range of about 0.0005 inches to about 0.003 inches or about 0.001 inches to about 0.002 inches. In some embodiments, at least about 60%, at least about 70%, or at least about 80% of the cellular structures are closed.

The foamed jacket 105' can provide certain advantages. For example, by forming the jacket of a foamed polymeric material, the amount of flammable material in the communications cable can be reduced. Further, the foamed jacket helps dissipate the heat generated inside the cable to the external environment.

The thickness of the jacket can be, for example, in a range of about 0.005 inches to about 0.015 inches, though other thicknesses may also be utilized.

Figure 4:
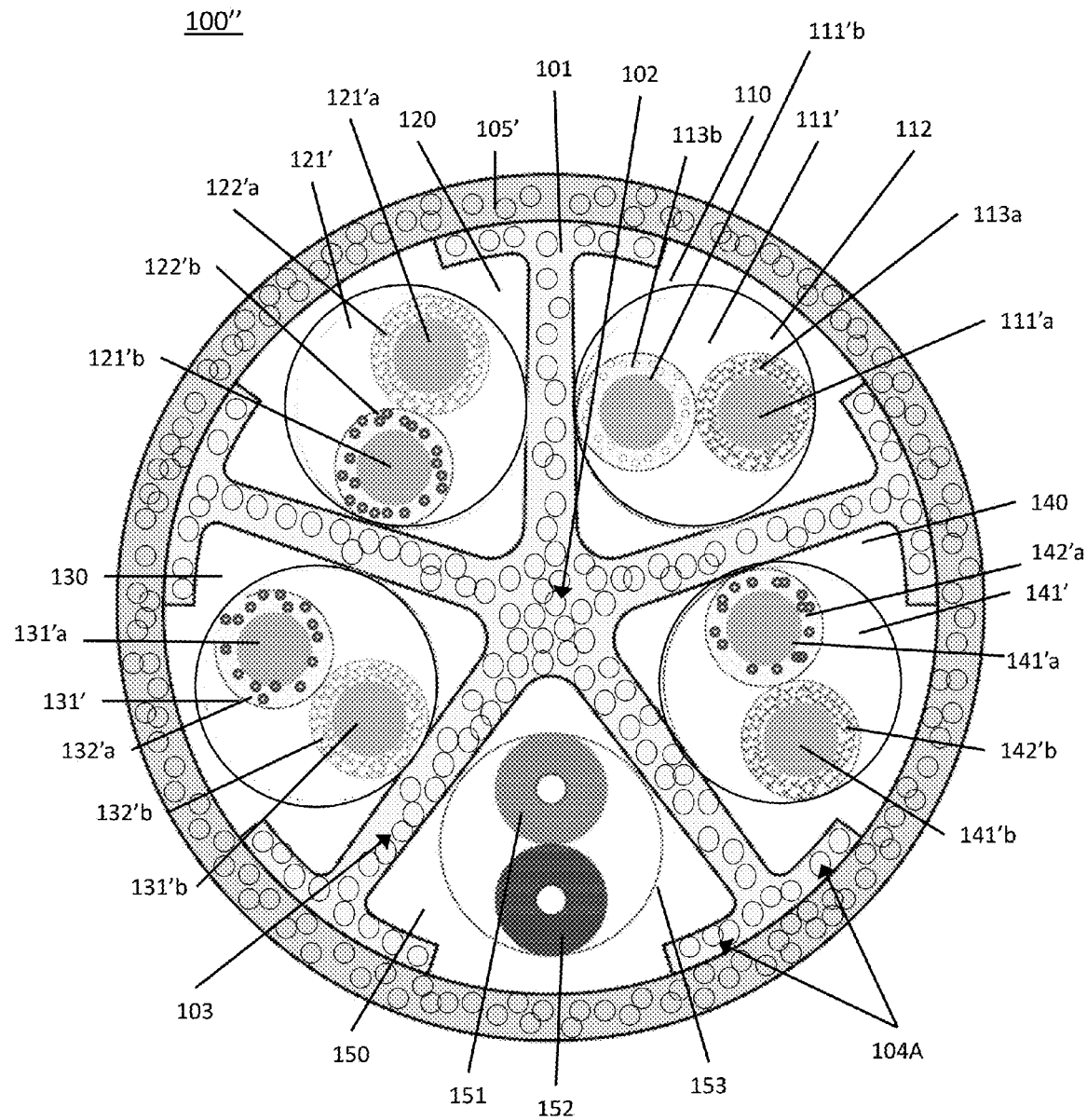
FIG. 4 illustrates another embodiment of a POE cable in which electrical conductors have foamed insulation.

In some embodiments, not only the separator and the jacket are formed of foamed polymeric materials, but also the insulation surrounding one or more of the electrical conductors disposed in the channels provided by the separator are formed of foamed polymeric materials. By way of example, FIG. 4 schematically depicts another embodiment 100" of a communications cable according to an embodiment of the present teachings, which is similar in all respects to the communications cable 100' discussed above in connection with FIG. 3, except that in this embodiment, each of the electrical conductors of the twisted pairs has a foamed insulation. More specifically, twisted pairs of electrical conductors 111', 121', 131', and 141' are disposed, respectively, in the channels 110, 120, 130, and 140. Each electrical conductor of each twisted pair includes a foamed insulation. By way of example, the twisted pair 111' includes two electrical conductors 111'*a* and 111'*b*, where the electrical conductor 111'*a* includes a foamed insulation 113*a* and the electrical conductor 111'*b* includes a foamed insulation 113*b*. Similarly, the twisted pair 121' includes electrical conductors 121'*a* and 121'*b* having, respectively, foamed insulations 122'*a* and 122'*b*. The twisted pairs 131' includes electrical conductors 131'*a* and 131'*b* having, respectively, foamed insulations 132'*a* and 132'*b*, and the twisted pair 141' includes electrical conductors 141'*a* and 141'*b* having, respectively, foamed insulations 142'*a* and 142'*b*.

In some embodiments, the foamed insulation can have a foaming level in a range of about 20% to about 60%, about 20% to about 70%, or about 30% to about 60%. Further, the foamed polymeric material can comprise a plurality of cellular structures (depicted schematically herein by a plurality of circles distributed within the insulation) characterized by a size in a range of about 0.0005 inches to about 0.003 inches or about 0.001 inches to about 0.002 inches. In some embodiments, at least about 60%, at least about 70%, or at least about 80%, of the cellular structures are closed.

The use of foamed insulation for the electrical conductors in the communications cable 100" can provide certain advantages. For example, it reduces the amount of potentially flammable material inside the cable, and it can in some cases help with heat management by facilitating the dissipation of heat generated in the electrical conductor.

Similar to the previous embodiments, in this embodiment, the jacket 105' has an inner diameter less than about 0.4 inches, e.g., in a range of about 0.24 inches to about 0.4 inches.

Figure 5:
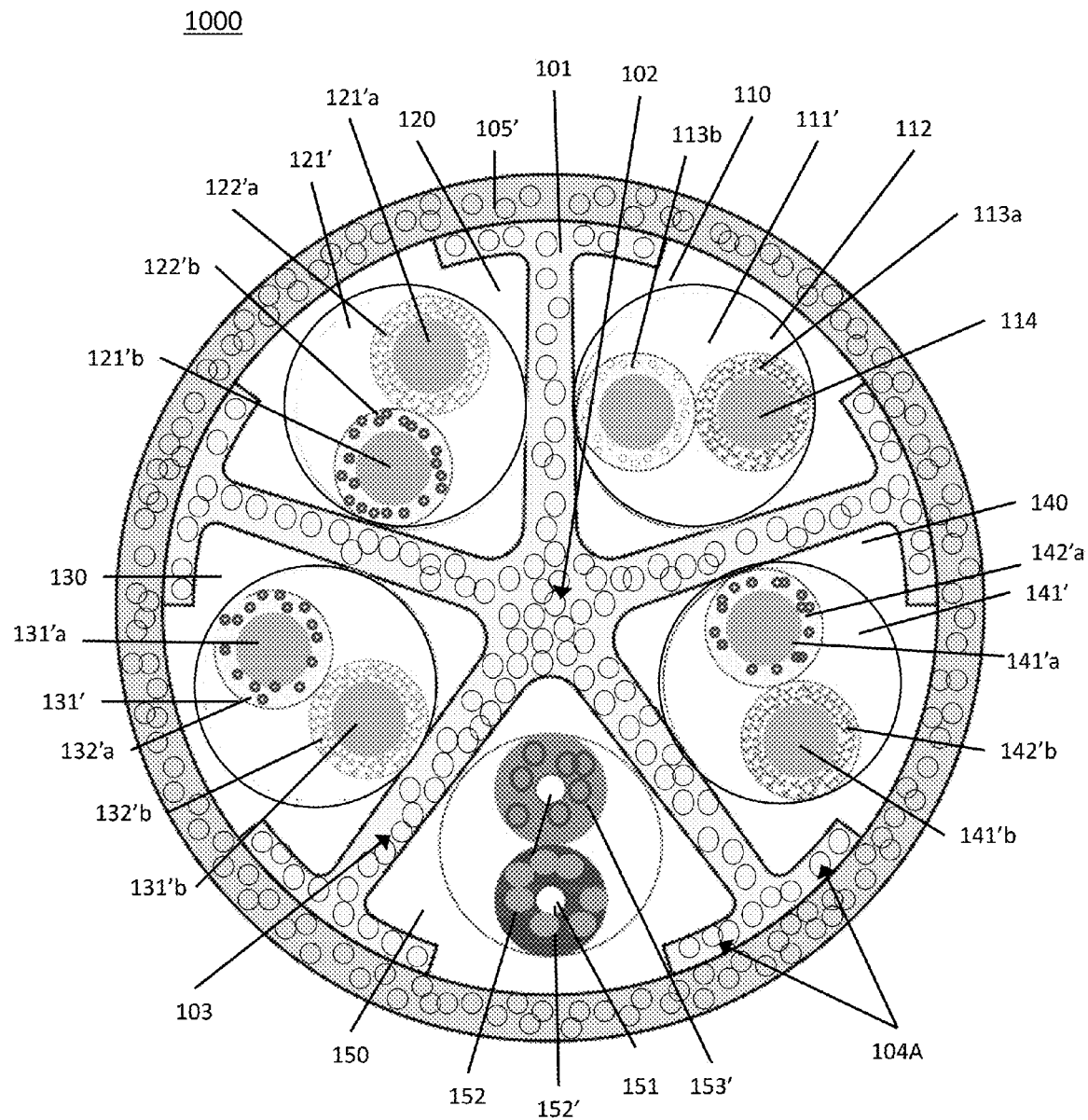
FIG. 5 illustrates another embodiment of a POE cable according to the present teachings.

In some embodiments, in addition to the separator, the jacket, the insulation of the electrical conductor, the bufferings of the fiber optics disposed in the communications cable can also be formed of a foamed polymeric material, such as fluoropolymer materials. Some suitable polymeric materials are those discussed above. By way of example, FIG. 5 schematically depicts such an embodiment 1000, which is similar to the communications cable 100" discussed in connection with FIG. 4, except that in this embodiment the fiber optic bufferings are formed of a foamed polymer. More specifically, the communications cable 1000 includes two fiber optics 151 and 152 disposed in one of the channels provided by the separator 101. The fiber optic 151 includes a foamed buffering 152' and the fiber optic 152 includes a foamed buffering 153'. The foaming level of the foamed bufferings can be, for example, in a range of about 20% to about 70%, though other foaming levels can also be employed.

A variety of known techniques can be employed to fabricate a communications cable according to the present teachings, such as the embodiments discussed above. For example, the foaming of various components of the communications cable, such as the separator, the wire insulation, the jacket and/or the fiber optic bufferings, can be made using chemical foaming and/or gas-injection foaming techniques. By way of example, in some embodiments, the compositions and methods disclosed in U.S. Pat. Nos. 7,968,613, 8,278,366, 8,318,819, 8,877,823, and 8,912,243, each of which is herein incorporated by reference in its entirety, can be employed to foam various components of a communication cable according to the present teachings, such as the separator, the jacket, the wire insulation, etc.

Further, known cable manufacturing and assembly techniques, including known extrusion techniques, can be used to fabricate various cables according to the present teachings.

A communications cable according to the invention provides a number of advantages. For example, it allows the use of different transmission media within the same cable. In addition, it allows transmission of not only data but also electrical power. In addition, a communication cable according to the teachings of the invention allows efficient management of heat generated within the cable. In particular, as discussed above, in many embodiments one or more components of the cable, e.g., a separator used for providing channels in which transmission media are disposed and/or a jacket of the cable, are formed of foamed polymers (e.g., foamed fluoropolymers), which allow the heat generated within the cable to be efficiently dissipated. The efficient management of the heat generated within the cable in turn allows a compact construction of the cable. For example, in many embodiments, the inner diameter of the cable jacket can be less than about 0.4 inches.

EXAMPLES

Example 1

Figure 6:
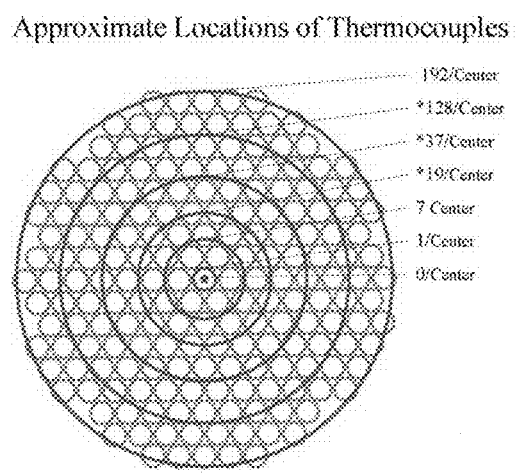
FIG. 6 schematically depicts the distribution of a plurality of thermocouples employed to measure the temperature at a plurality of locations within a bundle of cables.

The thermal behavior of five cable bundles, each including 192 cables, was studied using a test protocol commonly known as the U.L. test protocol. The temperatures at different locations within each cable bundle were monitored by employing a plurality of thermocouples distributed approximately as shown in FIG. 6.

I. Solid Polyolefin Insulation

Figure 7:
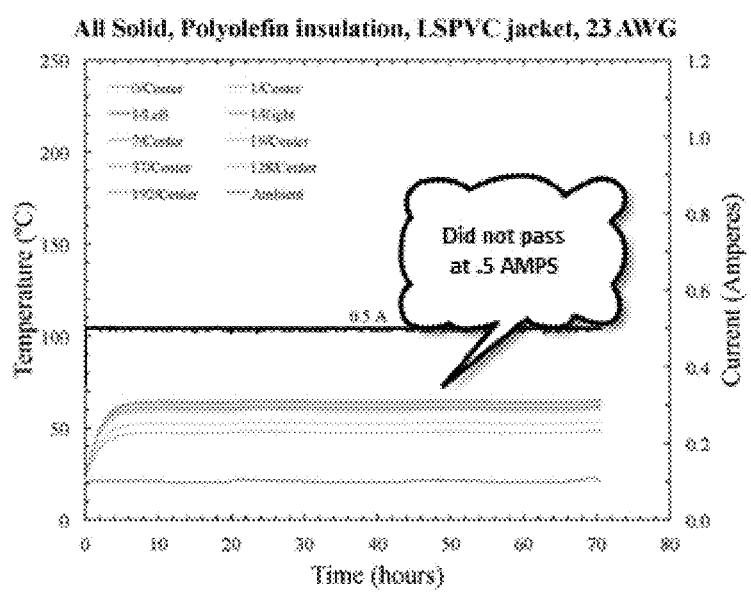
FIG. 7 shows temperatures recorded by a plurality of thermocouples as a function of time at a plurality of different locations for a bundle of 192 cables each including 4 twisted pairs of copper wires disposed in an LSPVC jacket, where the copper wires were insulated with a layer of polyolefin
Figure 8:
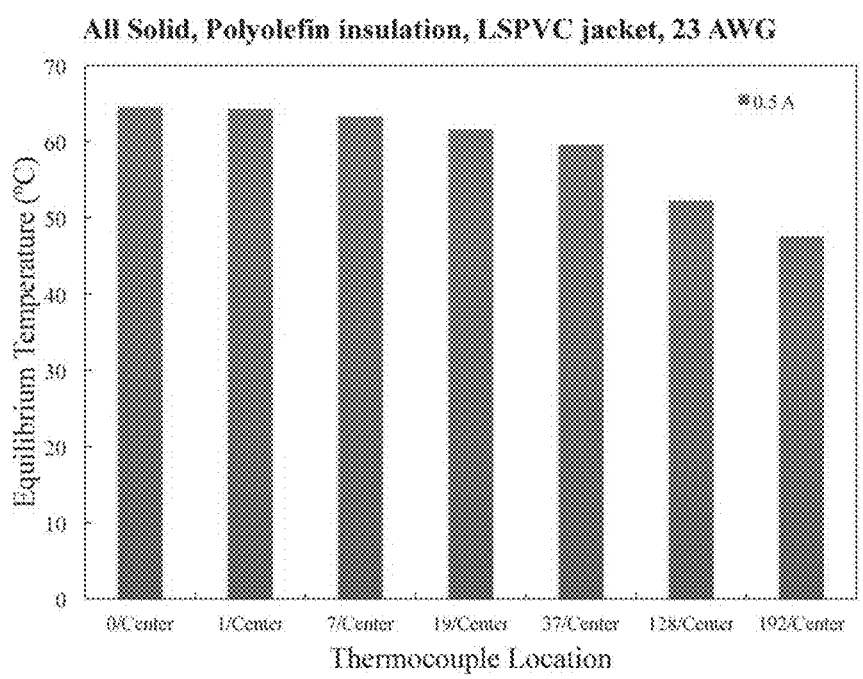
FIG. 8 shows equilibrium temperatures recorded by the thermocouples used to obtain the temperature data presented in FIG. 7.

A bundle of 192 cables each including 4-twisted pairs of copper wires disposed in an LSPVC jacket was tested. The cables were manufactured using well known extrusion techniques. Each copper wire was selected to have a 23 AWG and was insulated with a layer of polyolefin. The cables did not include a separator for separating different twisted pairs from one another. FIG. 7 shows temperatures recorded by the thermocouples as a function of time for different currents flowing through each cable. FIG. 8 shows the equilibrium temperatures recorded by the thermocouples for this cable bundle. This cable bundle showed a temperature rise of greater than 60° C. for an ambient temperature of 45° C. and a current of 0.5 amperes flowing through each cable, thus not meeting the temperature rating for the U.L. requirement.

II. Solid Polyolefin/FEP Coextruded Insulation

Figure 9:
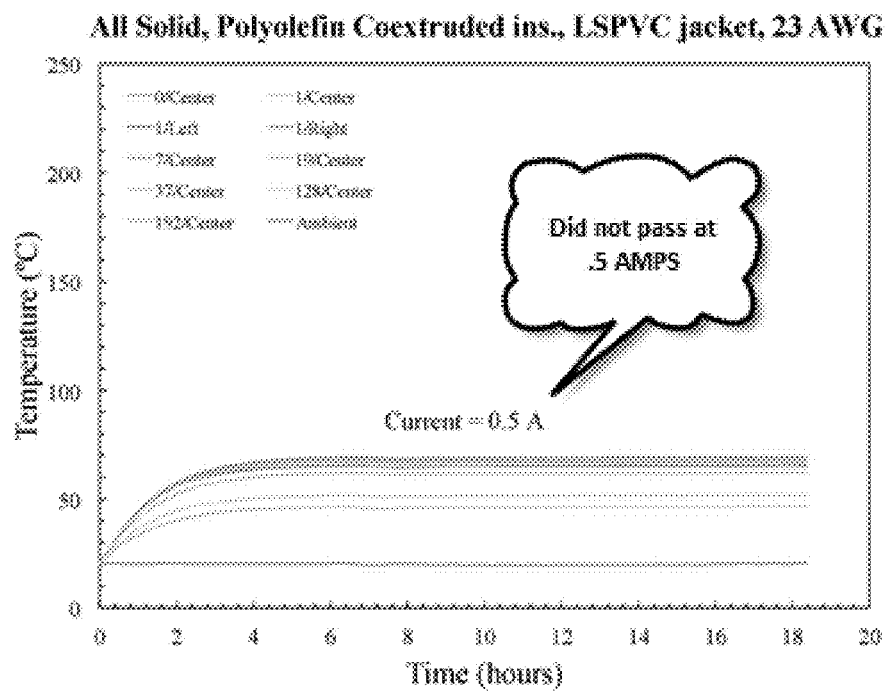
FIG. 9 shows temperatures recorded by a plurality of thermocouples as a function of time at a plurality of locations for another bundle of 192 cables each including 4 twisted pairs of copper wires disposed in an LSPVC jacket, where the copper wires were insulated with a two-layer insulation formed via coextrusion of polyolefin and FEP.
Figure 10:
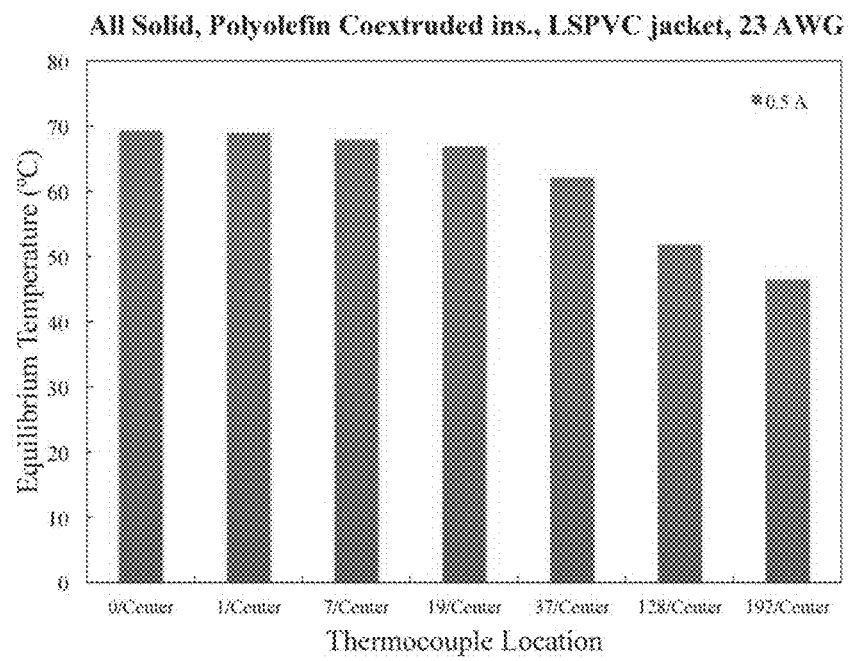
FIG. 10 shows equilibrium temperatures recorded by the thermocouples used to obtain the temperature data presented in FIG. 9.

A bundle of 192 cables each including 4-twisted pairs of copper wires disposed in an LSPVC jacket was tested. The cables were manufactured using well known extrusion techniques. Each copper wire was selected to have a 23 AWG and was insulated with a two-layer insulation formed via coextrusion of polyolefin and FEP. The cables did not include a separator for separating different twisted pairs from one another. FIG. 9 shows temperatures recorded by the thermocouples as a function of time for different currents flowing through each cable. FIG. 10 shows the equilibrium temperatures recorded by the thermocouples for this cable bundle. This cable bundle also showed a temperature rise of greater than 60° C. for an ambient temperature of 45° C. and a current of 0.5 amperes flowing through each cable, thus not meeting the temperature rating for the U.L. requirement.

III. All Solid FEP Insulation, Crossweb and Jacket

Figure 11:
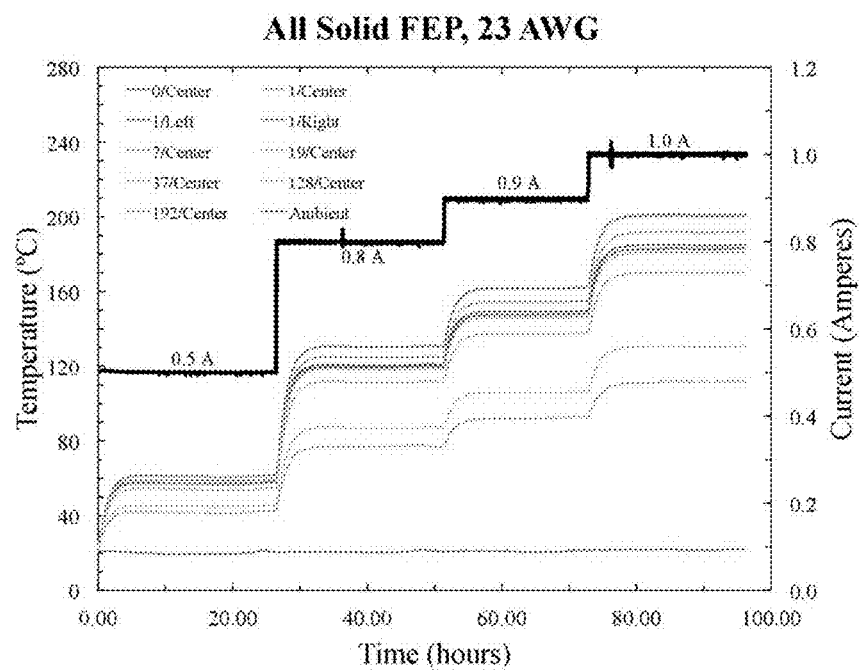
FIG. 11 shows temperatures recorded by a plurality of thermocouples as a function of time at a plurality of locations for a bundle of 192 cables each including 4 twisted pairs of copper wires disposed in an FEP jacket, where the copper wires were insulated with an insulation layer formed of FEP.
Figure 12:
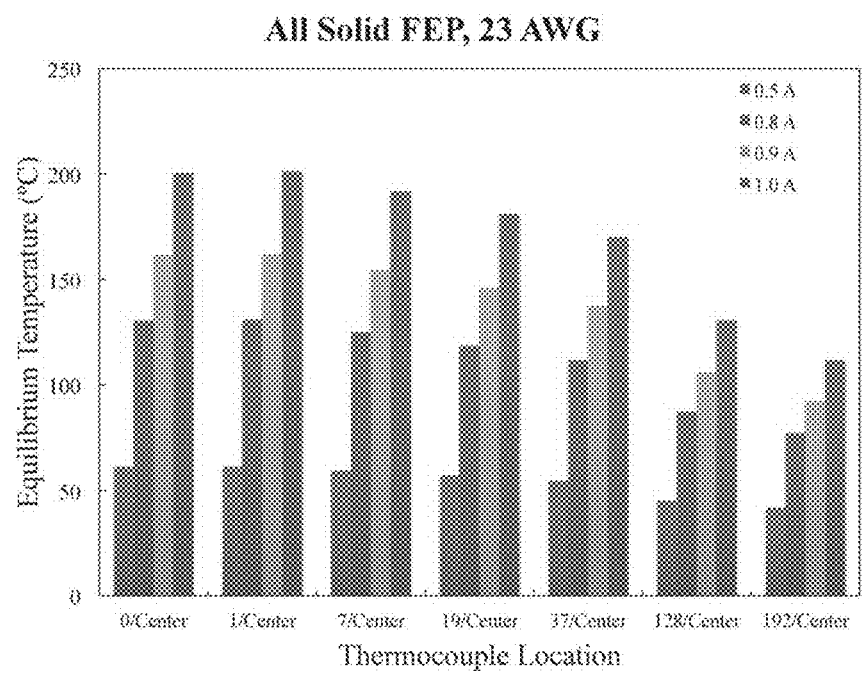
FIG. 12 shows equilibrium temperatures recorded by the thermocouples used to obtain the temperature data presented in FIG. 11.

A bundle of 192 cables each including 4-twisted pairs of copper wires disposed in a jacket formed of FEP was tested. The cables were manufactured using well known extrusion techniques. Each copper wire was selected to have a 23 AWG and was insulated with an insulation layer formed of FEP. Each cable further included a crossweb formed of FEP providing separate channels in each of which one of the twisted pairs was disposed. FIG. 11 shows the temperatures recorded by the thermocouples as a function of time for different currents flowing through each cable. FIG. 12 shows the equilibrium temperatures recorded by the thermocouples. The data shows that this cable bundle exhibited much enhanced thermal properties relative to the previous two cables.

IV. All Foamed FEP Insulation, Crossweb and Jacket

Figure 13:
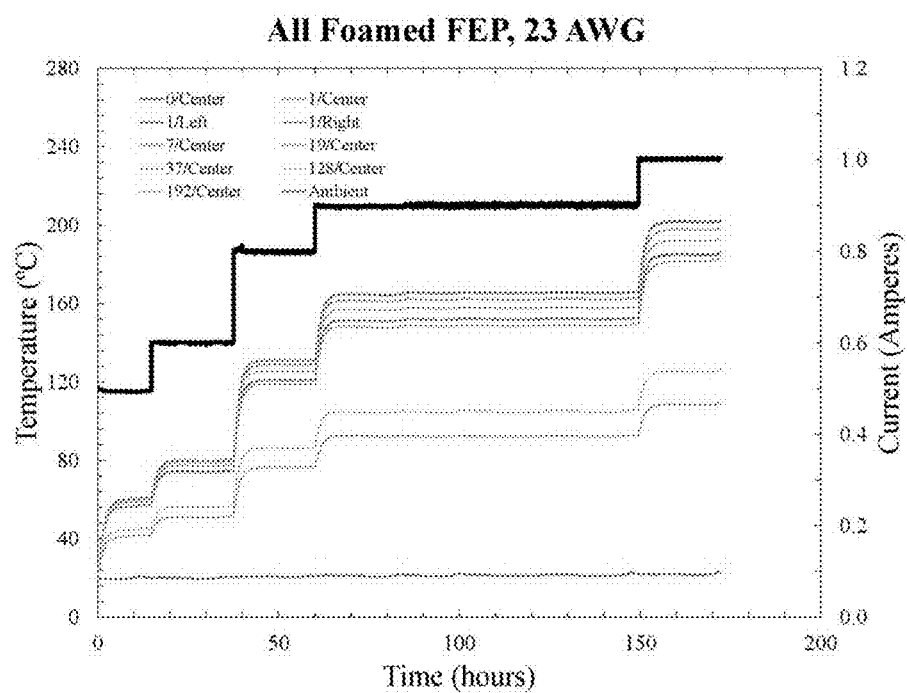
FIG. 13 shows temperatures recorded by a plurality of thermocouples as a function of time at a plurality of locations for a bundle of 192 cables each including 4 twisted pairs of copper wires disposed in an foamed FEP jacket, where the copper wires were insulated with a layer of foamed FEP.
Figure 14:
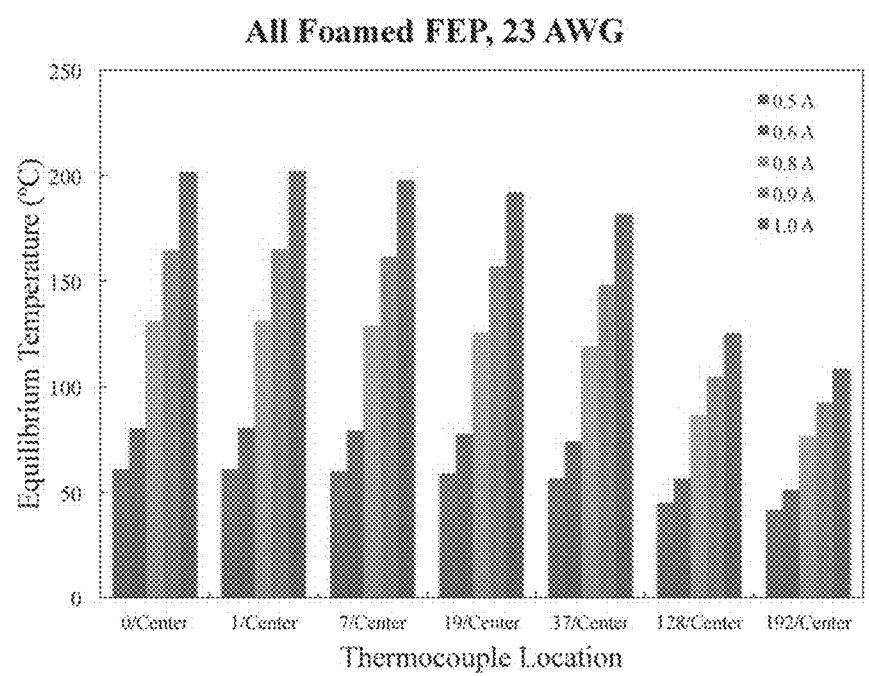
FIG. 14 shows equilibrium temperatures recorded by the thermocouples used to obtain the temperature data presented in FIG. 13.

A bundle of 192 cables each including 4-twisted pairs of copper wires disposed in a jacket formed of foamed FEP was tested. The cables were manufactured using well known extrusion techniques. Each copper wire was selected to have a 23 AWG and was insulated with an insulation layer formed of foamed FEP. Each cable further included a crossweb formed of foamed FEP providing separate channels in each of which one of the twisted pairs was disposed. The foaming of the insulation, crossweb and the jacket was achieved via chemical foaming using talc. FIG. 13 shows the temperatures recorded by the thermocouples as a function of time for different currents flowing through each cable. FIG. 14 shows the equilibrium temperatures recorded by the thermocouples. This cable exhibited acceptable temperature rise up to 0.9 amperes.

V. All Foamed MFA Insulation, Crossweb and Jacket

Figure 15:
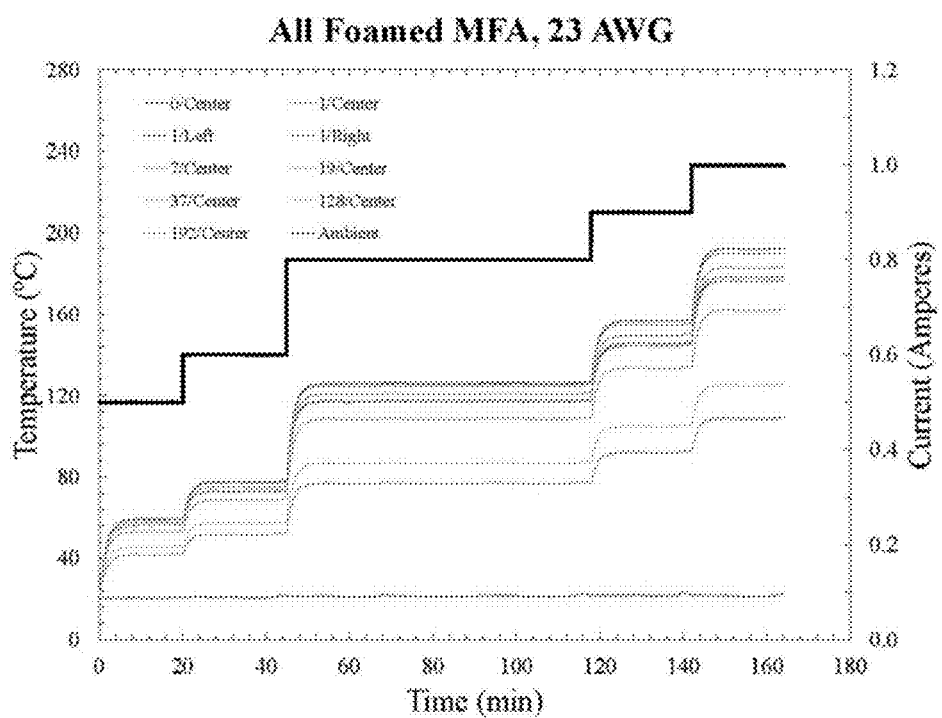
FIG. 15 shows temperatures recorded by a plurality of thermocouples as a function of time at a plurality of locations for a bundle of 192 cables each including 4 twisted pairs of copper wires disposed in a foamed MFA jacket.
Figure 16:
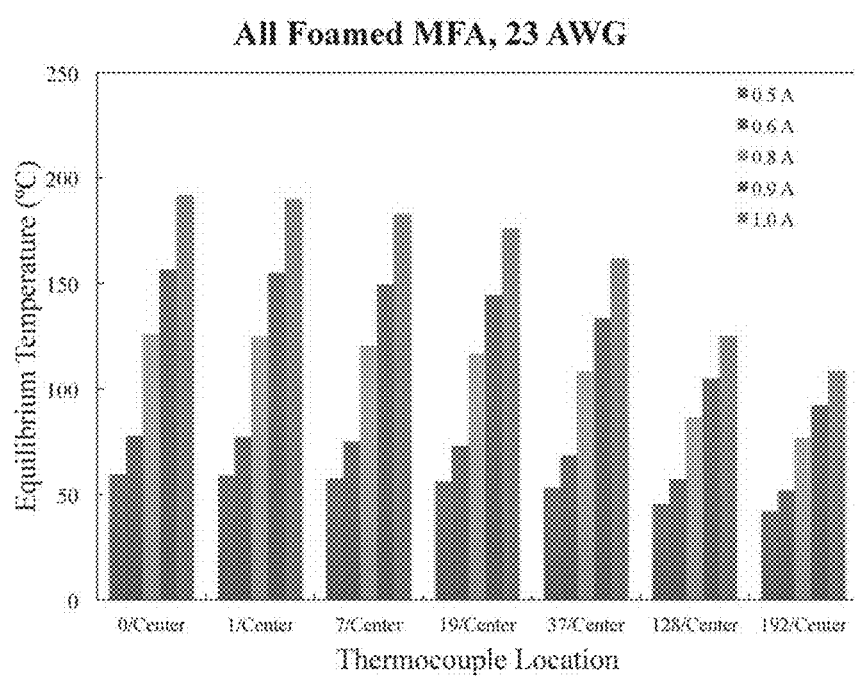
FIG. 16 shows equilibrium temperatures recorded by the thermocouples used to obtain the temperature data presented in FIG. 15.

A bundle of 192 cables each including 4-twisted pairs of copper wires disposed in a jacket formed of foamed MFA was tested. The cables were manufactured using well known extrusion techniques. Each copper wire was selected to have a 23 AWG and was insulated with an insulation layer formed of foamed MFA. The cable further included a crossweb formed of foamed MFA providing separate channels in each of which one of the twisted pairs was disposed. The foaming of the insulation, crossweb and the jacket was achieved via chemical foaming using talc. FIG. 15 shows the temperatures recorded by the thermocouples as a function of time for different currents flowing through each cable. FIG. 16 shows the equilibrium temperatures recorded by the thermocouples. This cable bundle exhibited acceptable temperature rise up to 1 ampere of current through each cable, the maximum current that was applied to the cables.

Example 2

Figure 17:
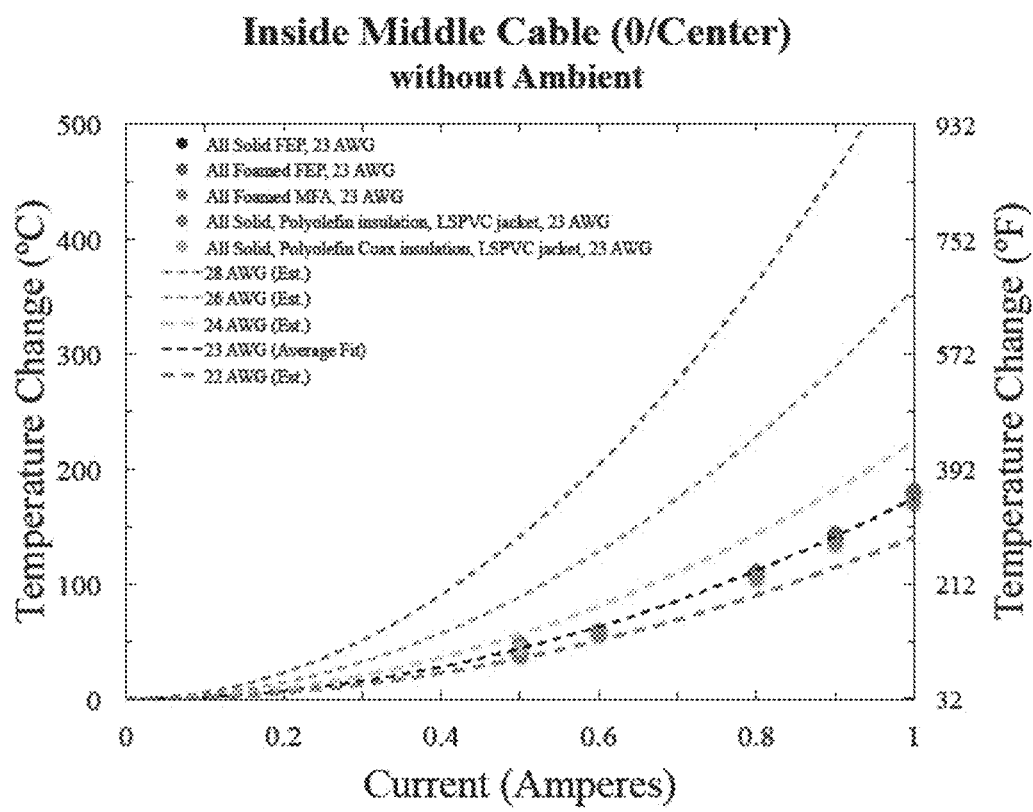
FIG. 17 shows measured and theoretically extrapolated temperature data for cable bundles formed of copper wires of different gauges.

The data presented in FIG. 17 shows that the gauge of the copper wires can have a significant impact on the temperature rise within a cable bundle as a function of current flowing through the cables. The data for a cable bundle with copper wires having a gauge of 23 AWG corresponds to the data for the cable bundles discussed above in Example 1. The data for the other gauges were obtained via extrapolation of the 23 AWG data based on the Ohmic resistance of the copper conductors using the following relation:

$$\Delta T_{AWG} = R_{AWG}\left(\frac{\Delta T_{23AWG}}{R_{23AWG}}\right) \quad \text{Eq. (1)}$$

where, $\Delta T_{AWG}$ indicates theoretically extrapolated change in temperature (relative to ambient temperature)

$R_{AWG}$ represents the Ohmic resistance of the wire used in the cable for which temperature extrapolation is desired, $\Delta T_{23AWG}$ represents measured temperature change for a cable bundle in which the copper wires have a gauge of 23 AWG, and $R_{23AWG}$ represents the Ohmic resistance of a copper wire having a gauge of 23 AWG.

Those having ordinary skill in the art will appreciate that various changes can be made to the above embodiments without departing from the scope of the invention.

The invention claimed is:

1. A communications cable comprising:
   a support separator configured to provide a plurality of channels for receiving transmission media, said support separator comprising a first foamed polymeric material;
   at least one optical fiber disposed in one of said channels;
   at least an electrical conductor having an American Wire Gauge (AWG) in a range of about 22 to about 26 and capable of carrying at least about 10 watts of electrical power disposed in another one of said channels;
   an insulation configured to at least partially cover said electrical conductor; and
   a jacket configured to surround said support separator and said transmission media, said jacket comprising a second foamed polymeric material;
   wherein said foamed polymeric material of any of the support separator and the jacket comprises a plurality of cellular structures characterized by cells having a size in a range of about 0.0005 inches to about 0.003 inches.

2. The communications cable of claim 1, wherein said first and second foamed polymeric material comprise different polymeric materials.

3. The communications cable of claim 1, wherein said electrical conductor is capable of carrying at least about 30 watts of power.

4. The communications cable of claim 1, wherein said electrical conductor is capable of carrying power in a range of about 10 watts to about 200 watts.

5. The communications cable of claim 1, wherein said jacket has an internal diameter equal to or less than about 0.4 inches.

6. The communications cable of claim 1, wherein said jacket has an internal diameter in a range of about 0.24 inches to about 0.32 inches.

7. The communications cable of claim 6, wherein said internal diameter is in a range of about 0.24 inches to about 0.27 inches.

8. The communications cable of claim 1, wherein any of the first and second foamed polymeric material and said insulation comprises a fluoropolymer.

9. The communications cable of claim 8, wherein said fluoropolymer is selected from the group consisting of MFA, FEP, PFA, PVF, ETFE, ECTFE, and PVDF.

10. The communications cable of claim 8, wherein said fluoropolymer comprises a perfluoropolymer.

11. The communications cable of claim 10, wherein said perfluoropolymer comprises any of FEP, MFA, and PFA.

12. The communications cable of claim 1, wherein said electrical conductor comprises a twisted pair conductor.

13. The communications cable of claim 1, wherein said optical fiber is a multi-mode optical fiber.

14. The communications cable of claim 1, wherein said optical fiber is a single-mode optical fiber.

15. The communications cable of claim 1, wherein said insulation comprises a foamed polymer.

16. The communications cable of claim 15, wherein said foamed polymeric material of any of the support separator and the jacket exhibits a foaming level in a range of about 20% to about 60%.

17. The communications cable of claim 16, wherein said foamed polymeric material of any of the support separator and the jacket exhibits a foaming level in a range of about 20% to about 70%.

18. The communications cable of claim 17, wherein said foamed polymeric material of any of the support separator and the jacket exhibits a foaming level in a range of about 30% to about 60%.

19. The communications cable of claim 1, wherein said cellular structures are characterized by a size in a range of about 0.001 inches to about 0.002 inches.

20. The communications cable of claim 1, wherein at least about 60% of said cellular structures are closed cells.

21. The communications cable of claim 1, wherein at least about 70% of said cellular structures are closed cells.

22. The communications cable of claim 1, wherein said support separator has a flap-top configuration.

23. The communications cable of claim 1, wherein said jacket has a thickness in a range of about 0.005 inches to about 0.015 inches.

24. The communications cable of claim 23, wherein said jacket has a thickness in a range of about 0.007 inches to about 0.010 inches.

25. A communications cable, comprising:
a support separator configured to provide a plurality of channels, each configured to receive transmission media, said support separator comprising a first foamed polymeric material;
at least one optical fiber disposed in one of said channels;
at least an electrical conductor having an American Wire Gauge (AWG) in a range of about 22 to about 26 and capable of carrying at least about 10 watts of electrical power disposed in another one of said channels;
a tape configured to surround said at least an electrical conductor, said tape comprising a solid or a foamed second polymeric material;
a jacket configured to support said support separator, said tape and said transmission media, said jacket comprising a third foamed polymeric material;
wherein said foamed polymeric material of any of the support separator and the jacket comprises a plurality of cellular structures characterized by cells having a size in a range of about 0.0005 inches to about 0.003 inches.

26. The communications cable of claim 25, wherein said first and second foamed polymeric materials comprise the same polymeric materials.

27. The communications cable of claim 26, wherein said first and second foamed polymeric materials comprise different polymeric materials.

28. The communications cable of claim 25, wherein said first and third polymeric foamed materials comprise the same polymeric materials.

29. The communications cable of claim 25, wherein said first and third polymeric foamed materials comprise different polymeric materials.

* * * * *